(12) United States Patent
Byun et al.

(10) Patent No.: US 12,313,818 B2
(45) Date of Patent: May 27, 2025

(54) OPTICAL FILM AND DISPLAY DEVICE INCLUDING THE SAME

(71) Applicant: LG Display Co., Ltd., Seoul (KR)

(72) Inventors: Se Yeop Byun, Paju-si (KR); Hyun Woo Cho, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 25 days.

(21) Appl. No.: 18/216,313

(22) Filed: Jun. 29, 2023

(65) Prior Publication Data

US 2024/0219607 A1    Jul. 4, 2024

(30) Foreign Application Priority Data

Dec. 29, 2022   (KR) .......................... 10-2022-0189842

(51) Int. Cl.
*G02B 3/00*       (2006.01)
*G02B 1/14*       (2015.01)
*G02F 1/1335*     (2006.01)

(52) U.S. Cl.
CPC ............. *G02B 1/14* (2015.01); *G02F 1/1335* (2013.01)

(58) Field of Classification Search
CPC ... G02B 3/0062; G02B 3/0068; G02B 3/0075

USPC .......................................................... 349/84
See application file for complete search history.

(56) References Cited

U.S. PATENT DOCUMENTS

| | | | | |
|---|---|---|---|---|
| 6,462,794 | B1* | 10/2002 | Yoshikawa | G02B 3/0062 348/E5.143 |
| 2002/0176172 | A1* | 11/2002 | Nemoto | B29C 65/14 359/619 |
| 2014/0347728 | A1* | 11/2014 | Lee | G02B 5/3083 359/489.07 |
| 2016/0170160 | A1* | 6/2016 | Akabane | G02B 6/4239 385/33 |
| 2023/0094504 | A1* | 3/2023 | Daehnert | H04N 13/349 348/59 |

* cited by examiner

*Primary Examiner* — Christopher M Raabe
(74) *Attorney, Agent, or Firm* — Fenwick & West LLP (57) ABSTRACT

Disclosed are an optical film and a display device including the same. The optical film includes a film layer made of a transmissive material capable of transmitting light, an adhesive layer located in an adhesion area defined in an edge region of an upper surface of the film layer, a structure layer located in a receiving area defined on the upper surface of the film layer so as to be separate from the adhesion area and having optical properties, and a protective layer made of a transmissive material capable of transmitting light, located on the structure layer and the adhesive layer and attached to the film layer via the adhesive layer.

12 Claims, 5 Drawing Sheets

OPTICAL FILM AND DISPLAY DEVICE INCLUDING THE SAME

CROSS REFERENCE TO RELATED APPLICATION

This application claims the benefit of Republic of Korea Patent Application No. 10-2022-0189842, filed on Dec. 29, 2022, which is incorporated herein by reference in its entirety.

TECHNICAL FIELD

The present disclosure generally relates to an optical film and a display device including the same.

BACKGROUND

With the development of information technology, the market for display devices, which act as an intermediary between users and information, is growing. Thus, use of display devices such as light-emitting displays (LEDs), quantum dot displays (QDDs), and liquid crystal displays (LCDs) is increasing.

A display device may display images in such a manner that drive signals, for example, scan signals and data signals, are supplied to sub-pixels formed on a display panel so that selected sub-pixels transmit light or directly emit light.

Display devices may use optical films composed of various laminates or structures depending on image implementation methods. Optical films may be used in various fields, such as stereoscopic image display devices configured to display three-dimensional images as well as display devices configured to display two-dimensional images. Research on optical films is underway.

SUMMARY

Accordingly, the present disclosure is directed to an optical film and a display device including the same that substantially obviate one or more problems due to limitations and disadvantages of the related art.

Embodiments of the present disclosure provide an optical film and a display device including the same, which are capable of improving optical performance by preventing or at least reducing introduction of contaminants so that residues generated during a manufacturing process or foreign substances do not adhere to the upper surface of a structure or do not remain in valleys of the structure and are capable of minimizing, preventing, or at least reducing occurrence of a mura phenomenon in an active area and resultant deterioration in display quality.

An optical film according to an embodiment of the present disclosure includes a film layer made of a transmissive material capable of transmitting light, an adhesive layer located in an adhesion area defined in an edge region of an upper surface of the film layer, a structure layer located in a receiving area defined on the upper surface of the film layer so as to be separate from the adhesion area and having optical properties, and a protective layer made of a transmissive material capable of transmitting light, located on the structure layer and the adhesive layer and attached to the film layer via the adhesive layer.

The protective layer and the structure layer may be disposed such that a lower surface of the protective layer and an upper surface of the structure layer are in contact with each other or are spaced apart from each other via the adhesive layer.

The receiving area may be defined as a space recessed relative to the adhesion area.

The adhesion area and the structure layer may be formed such that an upper surface of the adhesion area and an upper surface of the structure layer have the same height as each other.

The film layer and the protective layer may have the same size and the same shape as each other.

The structure layer may be formed in a shape of a lenticular lens including a plurality of lenses arranged in one direction.

A display device according to an embodiment of the present disclosure includes a display panel configured to display images, a light source configured to supply light to the display panel, and an optical film disposed between the display panel and the light source, wherein the optical film includes a film layer made of a transmissive material capable of transmitting light, an adhesive layer located in an adhesion area defined in an edge region of an upper surface of the film layer, a structure layer located in a receiving area defined on the upper surface of the film layer so as to be separate from the adhesion area and having optical properties, and a protective layer made of a transmissive material capable of transmitting light, located on the structure layer and the adhesive layer and attached to the film layer via the adhesive layer.

A display device according to an embodiment of the present disclosure includes a display panel configured to display two-dimensional images and an optical film located on a display surface of the display panel and configured to convert the two-dimensional images into three-dimensional images, wherein the optical film includes a film layer made of a transmissive material capable of transmitting light, an adhesive layer located in an adhesion area defined in an edge region of an upper surface of the film layer, a structure layer located in a receiving area defined on the upper surface of the film layer so as to be separate from the adhesion area and having optical properties, and a protective layer made of a transmissive material capable of transmitting light, located on the structure layer and the adhesive layer and attached to the film layer via the adhesive layer.

The protective layer and the structure layer may be disposed such that a lower surface of the protective layer and an upper surface of the structure layer are in contact with each other or are spaced apart from each other via the adhesive layer.

The receiving area may be defined as a space recessed relative to the adhesion area.

An optical film according to an embodiment of the present disclosure includes a film layer made of a transmissive material capable of transmitting light, an adhesive layer located in an adhesion area defined in an edge region of an upper surface of the film layer, a structure layer located in a receiving area defined on the upper surface of the film layer so as to be separate from the adhesion area and having optical properties, and a protective layer made of a transmissive material capable of transmitting light, located on the structure layer and the adhesive layer and attached to the film layer via the adhesive layer, wherein an adhesion area the protective layer is defined such that a width thereof in the longitudinal direction and a width thereof in the lateral direction are equal to each other.

A display device according to an embodiment of the present disclosure includes a display panel configured to display images, a light source configured to supply light to the display panel, and an optical film as described above and disposed between the display panel and the light source.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION

Advantages and features of the present disclosure and methods for achieving them will be made clear from embodiments described below in detail with reference to the accompanying drawings. The present disclosure may, however, be embodied in many different forms, and should not be construed as being limited to the embodiments set forth herein. Rather, these embodiments are provided so that this disclosure will be thorough and complete, and will fully convey the scope of the invention to those skilled in the art.

In the drawings for explaining the exemplary embodiments of the present disclosure, for example, the illustrated shape, size, ratio, angle, and number are given by way of example, and thus, are not limited to the disclosure. Throughout the present specification, the same reference numerals designate the same constituent elements. The terms "comprises," "includes," and/or "has", used in this specification, do not preclude the presence or addition of other elements unless used along with the term "only". The singular forms are intended to include the plural forms as well, unless the context clearly indicates otherwise.

In the interpretation of constituent elements, the constituent elements are interpreted as including an error range even if there is no explicit description thereof.

In the description of the various embodiments, when describing positional relationships, for example, when the positional relationship between two parts is described using "on", "above", "below", "next to", or the like, one or more other parts may be located between the two parts unless the term "directly" or "closely" is used.

It may be understood that, although the terms "first", "second", etc. may be used herein to describe various elements, these elements are not to be limited by these terms. These terms are merely used to distinguish one element from another. Therefore, in the present specification, an element indicated by "first" may be the same as an element indicated by "second" without exceeding the technical scope of the present disclosure, unless otherwise mentioned.

A display device according to the present disclosure may be implemented in televisions, video players, personal computers (PCs), home theater systems, automotive electrical devices, smartphones, and so on, without being limited thereto. The display device according to the present disclosure may be implemented as a light-emitting display device, a quantum dot display device, or a liquid crystal display device. For convenience of description, a display device that directly emits light based on an inorganic light-emitting diode or an organic light-emitting diode is taken as an example of the display device according to the present disclosure.

The same reference numerals used throughout the specification refer to substantially the same constituent elements. Hereinafter, embodiments of the present disclosure will be described in detail with reference to the accompanying drawings. In the following description of the present disclosure, a detailed description of known functions or configurations incorporated herein will be omitted when it may make the subject matter of the present disclosure rather unclear.

Figure 1:
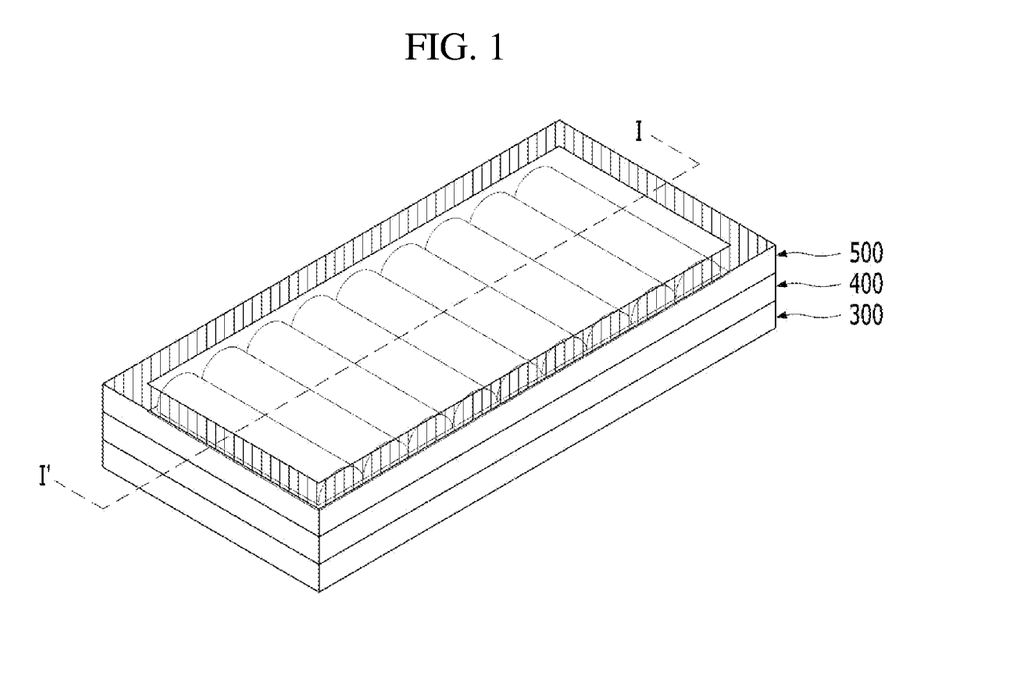
FIG. 1 is a perspective view of an optical film according to a first embodiment.
Figure 2:
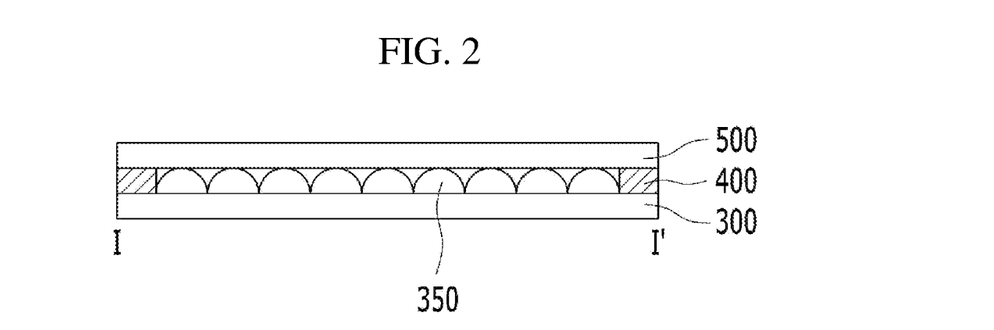
FIG. 2 is a cross-sectional view taken along line I-I' in FIG. 1 according to an embodiment.

FIG. 1 is a perspective view of an optical film according to a first embodiment, and FIG. 2 is a cross-sectional view taken along line I-I' in FIG. 1 according to the first embodiment.

As shown in FIGS. 1 and 2, an optical film according to a first embodiment may include a film layer 300, an adhesive layer 400, and a protective layer 500. The film layer 300 and the protective layer 500 may be made of a highly transparent (highly transmissive) material capable of transmitting light (images). The optical film according to the first embodiment may have a rectangular shape in which the length thereof in the lateral direction is longer than the length thereof in the longitudinal direction.

The film layer 300 may include a structure layer 350. The structure layer 350 may be located on the upper surface of the film layer 300. The structure layer 350 may be separately provided from the film layer 300, and may be attached to the film layer 300. Alternatively, the structure layer 350 may be formed integrally with the film layer 300.

The structure layer 350 may have optical properties. For example, the structure layer 350 may be formed in a lenticular lens shape, in which a plurality of lenses is arranged in one direction. However, this is merely given by way of example, and the structure layer 350 may be formed in any other structure having optical properties, for example, a prismatic shape or a microlens shape.

The structure layer 350, which is located on the upper surface of the film layer 300, may be formed such that an edge region of the film layer 300 is exposed. That is, the structure layer 350 may be formed such that an adhesion area, in which the adhesive layer 400 is formed, is defined on the upper surface of the film layer 300. For example, a region of the structure layer 350, which corresponds to the adhesion area, may be removed through patterning such that only a region thereof corresponding to an active area of a display panel remains.

The adhesive layer 400 may be located on the upper surface of the film layer 300. The adhesive layer 400 may be formed only in an adhesion area defined on the upper surface of the film layer 300 (an edge region of the film layer) or an adhesion area defined on the lower surface of the protective layer 500 (an edge region of the protective layer). That is, the adhesive layer 400 may be formed in a ring type corresponding to the edge region of the film layer 300 or the protective layer 500. The adhesive layer 400 may be formed as a double-sided adhesive layer having adhesiveness on both sides thereof.

The protective layer 500 may cover the film layer 300 and the upper surface of the structure layer 350 included in the film layer 300. The protective layer 500 may be located such that the adhesive layer 400 is adhered only to the adhesion area defined in the protective layer 500 (the edge region of the protective layer) and the remaining area of the protective layer 500 is placed on the structure layer 350. The protective layer 500 may have the same size and the same shape as the film layer 300 so as to be attached to the film layer 300 via the adhesive layer 400, thereby protecting the structure layer 350.

Referring to FIG. 2, the film layer 300 and the protective layer 500 are attached to each other, and the lower surface of the protective layer 500 and the upper surface of the structure layer 350 may be in contact with each other (in a point contact manner). This structure is realized when the adhesive layer 400 and the structure layer 350 are designed to have the same height as each other. However, the first embodiment is not limited to the structure shown in FIG. 2, and may vary depending on the height of the adhesive layer 400.

Figure 3:
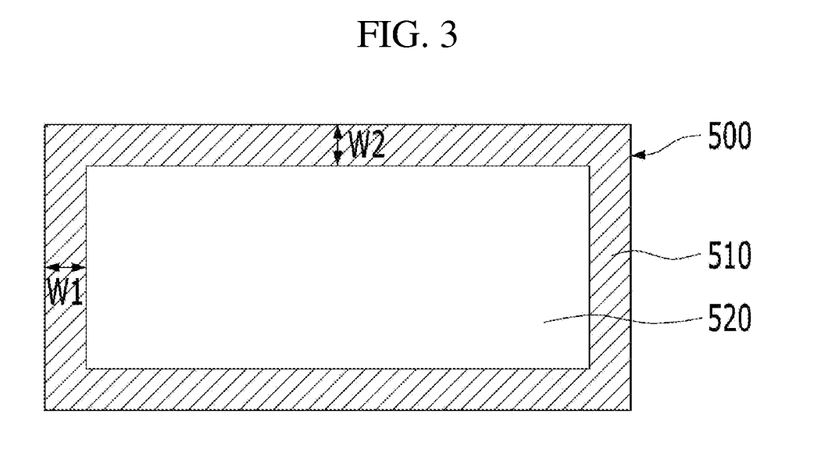
FIG. 3 is a front view of a protective layer included in the optical film according to the first embodiment.
Figure 4:
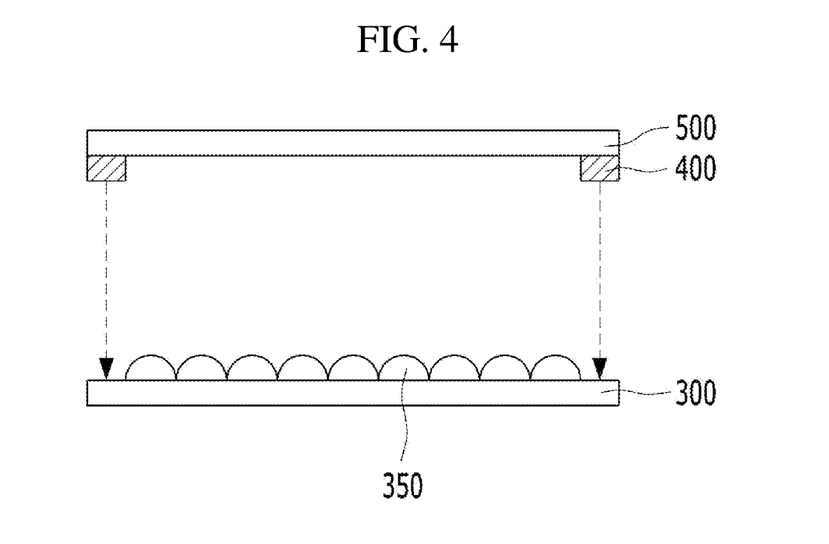
FIG. 4 is a cross-sectional view showing a process of attaching the protective layer including an adhesive layer to an upper surface of a film layer including a structure layer according to an embodiment.
Figure 5:
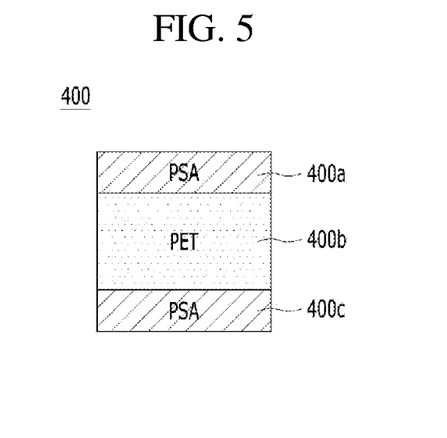
FIG. 5 is a cross-sectional view of the adhesive layer according to an embodiment.

FIG. 3 is a front view of the protective layer included in the optical film according to the first embodiment, FIG. 4 is a cross-sectional view showing a process of attaching the protective layer, including the adhesive layer, to the upper surface of the film layer including the structure layer according to the first embodiment, and FIG. 5 is a cross-sectional view of the adhesive layer according to the first embodiment.

As shown in FIG. 3, the protective layer 500 included in the optical film may include an adhesion area 510, to which the adhesive layer 400 is adhered, and a protective area 520, which protects the structure layer 350. The adhesion area 510 of the protective layer 500 may be defined such that a width W1 thereof in the longitudinal direction and a width W2 thereof in the lateral direction are equal to each other (W1=W2). However, the width W1 in the longitudinal direction and the width W2 in the lateral direction may vary depending on the purpose of the optical film and a position at which the optical film is mounted.

As shown in FIGS. 4 and 5, the film layer 300 may be manufactured in a form including the structure layer 350, and the protective layer 500 may be manufactured in a form including the adhesive layer 400. The protective layer 500 including the adhesive layer 400 may be disposed on the film layer 300 including the structure layer 350 so as to be aligned therewith. The protective layer 500 may be attached to the film layer 300 via the adhesive layer 400.

The adhesive layer 400 may include a first adhesive layer 400a, a base layer 400b, and a second adhesive layer 400c in order to have adhesiveness on both sides thereof. The first adhesive layer 400a and the second adhesive layer 400c may be made of an acrylic-based or silicon-based material exhibiting adhesiveness, such as a pressure-sensitive adhesive (PSA) (attachment and detachment thereof is more easily achieved than an adhesive), without being limited thereto. The base layer 400b may be made of a resin-based material, such as polyethylene terephthalate (PET), without being limited thereto.

Figure 6A:
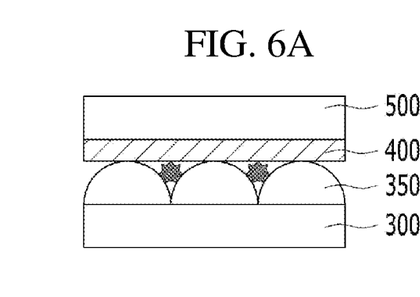
FIGS. 6A and 6B are views for explaining an advantage of the optical film of the first embodiment compared to an optical film of an experimental example according to an embodiment.
Figure 6B:
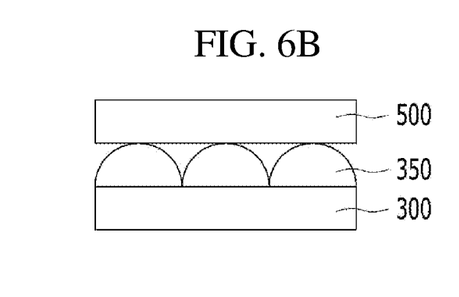

FIGS. 6A and 6B are views for explaining an advantage of the optical film of the first embodiment compared to an optical film of an experimental example.

As shown in FIG. 6A, the optical film of the experimental example may be manufactured such that a film layer 300 and a protective layer 500 are attached to each other via an adhesive layer 400 formed on the upper surface of a structure layer 350. The experimental example has a structure in which the adhesive layer 400 covers the entire surface of the structure layer 350, that is, the film layer 300, the structure layer 350, the adhesive layer 400, and the protective layer 500 have the same size as each other.

In the optical film of the experimental example, because the entire surface of the structure layer 350 is covered by the adhesive layer 400, residues of an adhesive constituting the adhesive layer 400 (residues of a PSA) or foreign substances (alternatively referred to as contaminants) may be attached to the upper surface of the structure layer 350 or may remain in valleys of the structure layer 350, thus causing optical interference. Consequently, a display device including the optical film of the experimental example may have a problem in that a mura phenomenon occurs in an active area, and therefore display quality may deteriorate.

As shown in FIG. 6B, the optical film of the first embodiment may be manufactured such that the protective layer 500, not the adhesive layer 400, is located on the upper surface of the structure layer 350. The structure of the optical film of the first embodiment has been described above with reference to FIGS. 1 to 4.

In the optical film of the first embodiment, since the entire surface of the structure layer 350 is covered by the protective layer 500, it is possible to minimize, prevent, or at least reduce optical interference due to residues of the adhesive constituting the adhesive layer 400 (residues of the PSA) or foreign substances (alternatively referred to as contaminants) being attached to the upper surface of the structure layer 350 or remaining in valleys of the structure layer 350. As a result, a display device including the optical film of the first embodiment may minimize, prevent, or at least reduce the occurrence of a mura phenomenon in an active area and resultant deterioration in display quality.

Figure 7:
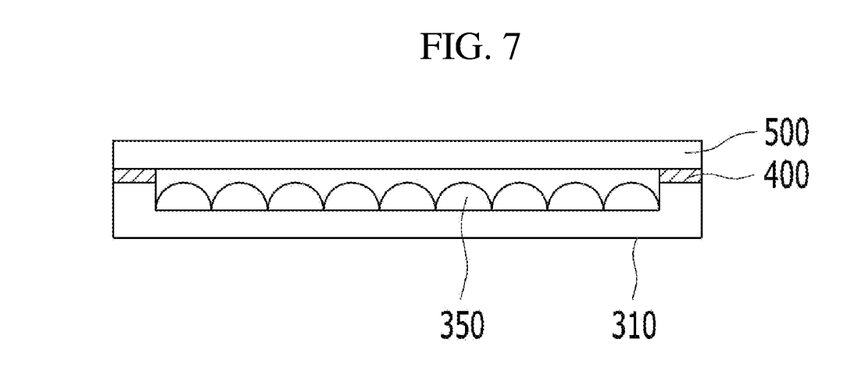
FIG. 7 is a cross-sectional view of an optical film according to a second embodiment.
Figure 8:
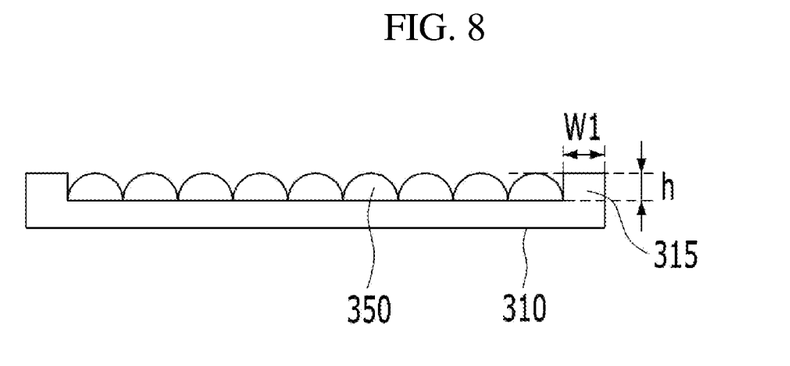
FIG. 8 is a cross-sectional view showing a film layer and a structure layer according to an embodiment.

FIG. 7 is a cross-sectional view of an optical film according to a second embodiment, and FIG. 8 is a cross-sectional view showing a film layer and a structure layer according to the second embodiment.

As shown in FIG. 7, an optical film according to a second embodiment may include a film layer 310, an adhesive layer 400, and a protective layer 500. The film layer 310 and the protective layer 500 may be made of a highly transparent (highly transmissive) material capable of transmitting light (images). The optical film according to the second embodiment may have a rectangular shape in which the length thereof in the lateral direction is longer than the length thereof in the longitudinal direction.

The film layer 310 may include a structure layer 350. The film layer 310 may include an adhesion area (an edge region of the film layer), in which the adhesive layer 400 is formed, and a receiving area (a receiving area corresponding to an active area of a display panel) defined as a space depressed (e.g., recessed) relative to the adhesion area. The film layer 310 may be patterned such that the receiving area other than the edge area of the film layer 310 is recessed in order to receive the structure layer 350 therein. That is, the film layer 310 may have an edge protruding structure in which the adhesion area protrudes relative to the receiving area.

The structure layer 350 may be located in the receiving area defined on the upper surface of the film layer 310. The structure layer 350 may be separately provided from the film layer 310, and may be attached to the film layer 310. Alternatively, the structure layer 350 may be formed integrally with the film layer 310. The structure layer 350 may have optical properties. For example, the structure layer 350 may be formed in a lenticular lens shape, in which a plurality of lenses is arranged in one direction. However, this is merely given by way of example, and the structure layer 350 may be formed in any other structure having optical properties, for example, a prismatic shape or a microlens shape.

The adhesive layer 400 may be located on the upper surface of the film layer 310. The adhesive layer 400 may be formed only in an adhesion area defined on the upper surface of the film layer 310 (an edge region of the film layer) or an adhesion area defined on the lower surface of the protective layer 500 (an edge region of the protective layer). The adhesive layer 400 may be formed as a double-sided adhesive layer having adhesiveness on both sides thereof.

The protective layer 500 may cover the film layer 310 and the upper surface of the structure layer 350 included in the film layer 310. The protective layer 500 may be located such that the adhesive layer 400 is adhered only to the adhesion area defined in the protective layer 500 (the edge region of the protective layer), and the remaining area of the protective layer 500 is placed on the structure layer 350. The protective layer 500 may have the same size and the same shape as the film layer 310 so as to be attached to the film layer 310 via the adhesive layer 400, thereby protecting the structure layer 350.

Referring to FIG. 7, the film layer 310 and the protective layer 500 are attached to each other, and the lower surface of the protective layer 500 and the upper surface of the structure layer 350 may be spaced apart from each other via the adhesive layer, rather than being in contact with each other. This structure is realized when the adhesive layer 400 is located between the film layer 310 and the protective layer 500 and the height of the upper surface of the adhesion area 315 of the film layer 310 and the height of the upper surface of the structure layer 350 are set to be similar or equal to each other (refer to "h" in FIG. 8).

However, the second embodiment is not limited to the structure shown in FIG. 7. For example, when the height of the adhesion area 315 of the film layer 310 is reduced by the height of the adhesive layer 400, the structure shown in FIG. 2 may be realized. The structure of the second embodiment may reduce the thickness of the optical film since the structure layer 350 is formed in the recessed space, not on the upper surface of the film layer 310. Accordingly, it is possible to reduce the thickness of a display panel by reducing the thickness of the optical film.

In addition, W1 representing the width of the adhesion area 315 of the film layer 310 may correspond to the width W1 of the protective layer 500 in the longitudinal direction (or the width W2 of the protective layer 500 in the lateral direction) shown in FIG. 3. However, the width W1 of the adhesion area 315 may vary depending on the purpose of the optical film and a position at which the optical film is mounted.

Figure 9:
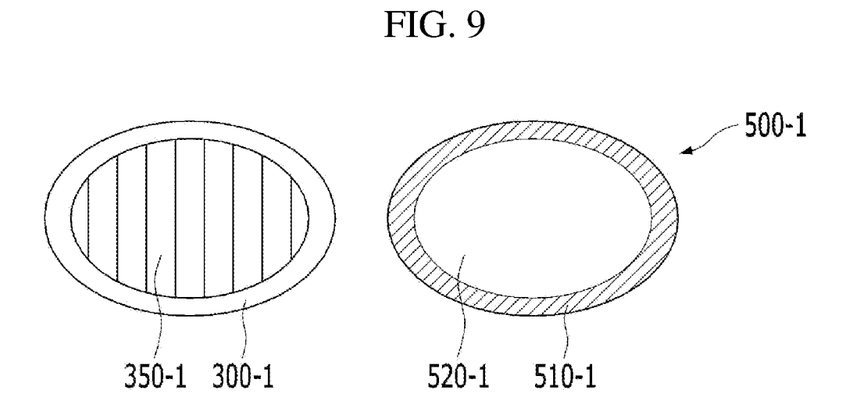
FIG. 9 is a front view separately showing a film layer and a protective layer of an optical film according to a third embodiment.
Figure 10:
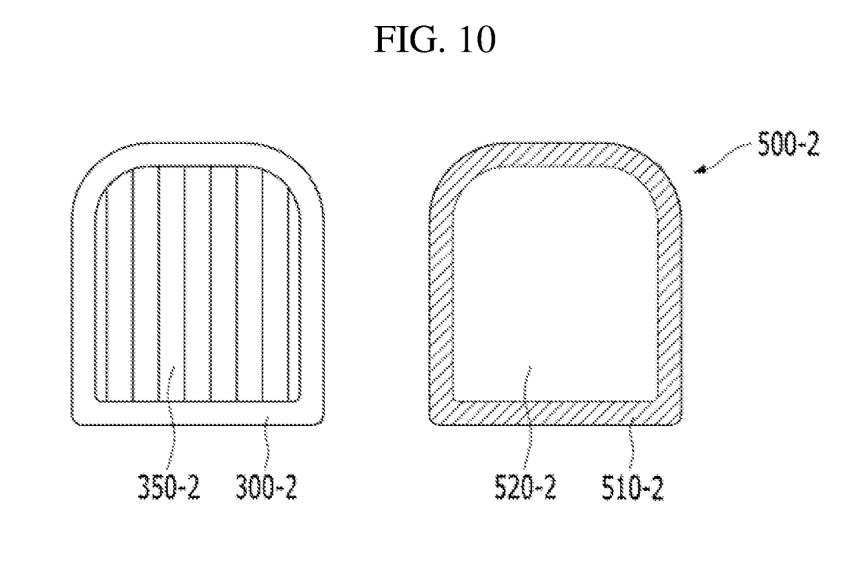
FIG. 10 is a front view separately showing a film layer and a protective layer of an optical film according to a fourth embodiment.

FIG. 9 is a front view separately showing a film layer and a protective layer of an optical film according to a third embodiment, and FIG. 10 is a front view separately showing a film layer and a protective layer of an optical film according to a fourth embodiment.

As shown in FIG. 9, an optical film according to a third embodiment may include a film layer 300-1 and a protective layer 500-1, which have a first shape. For example, the first shape of the optical film according to the third embodiment may be a circular (or elliptical) shape. Hereinafter, the optical film having a circular (or elliptical) shape will be described.

The film layer 300-1 may include an adhesion area (an edge region of the film layer) and a receiving area (a receiving area corresponding to an active area of a display panel), which have the first shape. Similar to the embodiments described above, the structure layer 350-1 may be formed in a lenticular lens shape, in which a plurality of lenses is arranged in one direction. The structure layer 350-1 may have an edge corresponding to the receiving area having the first shape.

The protective layer 500-1 may include an adhesion area 510-1 and a protective area 520-1, which have the first shape. The adhesion area 510-1 is an area in which the adhesive layer is located, and the protective area 520-1 is an area that protects the structure layer 350-1.

As shown in FIG. 10, an optical film according to a fourth embodiment may include a film layer 300-2 and a protective layer 500-2, which have a second shape, which is different from the first shape. For example, the second shape of the optical film according to the fourth embodiment may be a rectangular shape in which the length thereof in the longitudinal direction is longer than the length thereof in the lateral direction and at least two corners thereof are round. Hereinafter, the optical film having the second shape will be described.

The film layer 300-2 may include an adhesion area (an edge region of the film layer) and a receiving area (a receiving area corresponding to an active area of a display panel), which have the second shape. Similar to the embodiments described above, the structure layer 350-2 may be formed in a lenticular lens shape, in which a plurality of lenses is arranged in one direction. The structure layer 350-2 may have an edge corresponding to the receiving area having the second shape.

The protective layer 500-2 may include an adhesion area 510-2 and a protective area 520-2, which have the second shape. The adhesion area 510-2 is an area in which the adhesive layer is located, and the protective area 520-2 is an area that protects the structure layer 350-2.

As can be seen from the first to fourth embodiments, the shape of the optical film according to the embodiment of the present disclosure is not limited to one shape, and may vary so as to correspond to the shape of the display panel.

Figure 11:
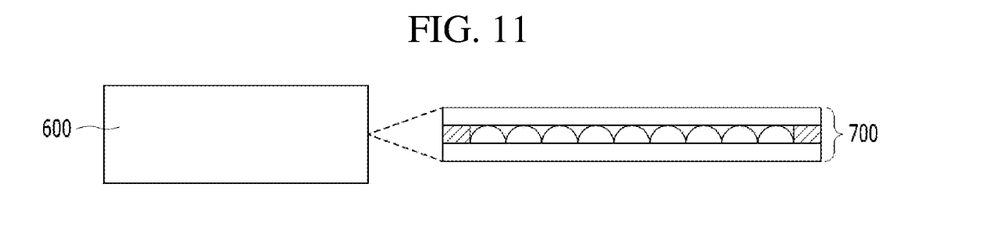
FIG. 11 is a conceptual diagram of a first display device including an optical film according to a fifth embodiment.
Figure 12:
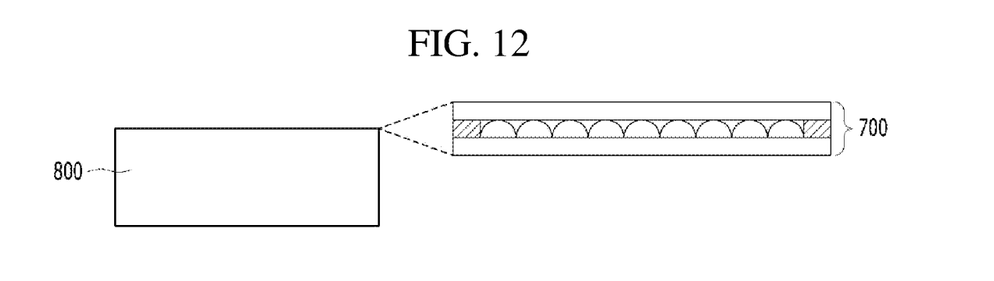
FIG. 12 is a conceptual diagram of a second display device including the optical film according to the fifth embodiment.
Figure 13A:
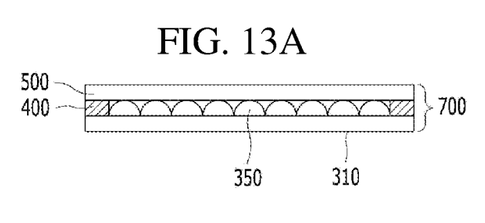
FIGS. 13A and 13B are cross-sectional view of the optical film included in the first display device and the second display device according to an embodiment.
Figure 13B:
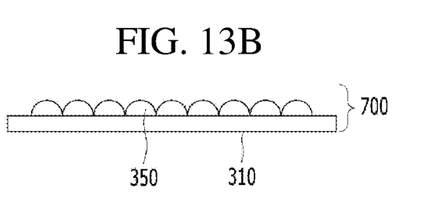

FIG. 11 is a conceptual diagram of a first display device including an optical film according to a fifth embodiment, FIG. 12 is a conceptual diagram of a second display device including the optical film according to the fifth embodiment, and FIGS. 13A and 13B are cross-sectional views of the optical film included in the first display device and the second display device.

As shown in FIG. 11, an optical film 700 selected from among the first to fourth embodiments described above may be disposed inside a first display module 600 included in the first display device. The first display module 600 may include a display panel configured to display two-dimensional images and a light source configured to supply light to the display panel. That is, the first display device may be implemented as a liquid crystal display device. In this case, the optical film 700 according to the fifth embodiment may be disposed between the display panel and the light source, which constitute the first display module 600.

As shown in FIG. 12, an optical film 700 selected from among the first to fourth embodiments described above may be disposed on a display surface of a second display module 800 of the second display device. The second display module 800 may include a display panel configured to display two-dimensional images and a three-dimensional conversion film disposed on a display surface of the display panel to convert (divide) the two-dimensional images into three-dimensional images. That is, the second display device may be implemented as a stereoscopic image display device (e.g., an autostereoscopic image display device). In this case, the optical film 700 according to the fifth embodiment may correspond to the three-dimensional conversion film constituting the second display module 800.

As shown in FIG. 13A, when included in the first display module 600 in FIG. 11 or the second display module 800 in FIG. 12, the optical film 700 according to the fifth embodiment may be disposed therein in the state in which the adhesive layer 400 and the protective layer 500 are provided in the optical film 700. The optical film 700 shown in FIG. 13A may be applied to a case in which a structure causing mechanical or structural interference is present on the optical film 700 or in which it is necessary to protect the structure layer 350 included in the film layer 300 from the outside.

As shown in FIG. 13B, when included in the first display module 600 in FIG. 11 or the second display module 800 in FIG. 12, the optical film 700 according to the fifth embodiment may be disposed therein in the state in which the adhesive layer and the protective layer are eliminated from the optical film 700. The optical film 700 shown in FIG. 13B may be applied to a case in which a structure causing mechanical or structural interference is not present on the optical film 700 or in which it is not necessary to protect the structure layer 350 included in the film layer 300 from the outside.

As can be seen from the examples shown in FIGS. 13A and 13B, some components of the optical film 700 may be eliminated depending on a method of implementing a display device, an optical function (a purpose and an effect), a positional relationship, and a coupling relationship between the optical film 700 and other structures, and the like.

As described above, the embodiment of the present disclosure is capable of improving optical performance by preventing or at least reducing introduction of contaminants so that residues generated during a manufacturing process or foreign substances do not adhere to the upper surface of the structure or do not remain in valleys of the structure. In addition, the embodiment of the present disclosure is capable of minimizing, preventing, or at least reducing occurrence of a mura phenomenon in an active area and resultant deterioration in display quality by preventing or at least reducing introduction of contaminants.

As is apparent from the above description, the embodiment has the following effects.

According to the optical film and the display device including the same of the present disclosure, it is possible to improve optical performance by preventing or at least reducing introduction of contaminants so that residues generated during a manufacturing process or foreign substances do not adhere to the upper surface of the structure or do not remain in valleys of the structure.

According to the optical film and the display device including the same of the present disclosure, it is possible to minimize, prevent, or at least reduce occurrence of a mura phenomenon in an active area and resultant deterioration in display quality by preventing or at least reducing introduction of contaminants.

According to the optical film and the display device including the same of the present disclosure, it is possible to improve optical performance without an increase in power consumption and thus to obtain an image quality improvement effect. As a result, it is possible to realize a low-power display capable of providing high-quality images with reduced power consumption.

It will be apparent to those skilled in the art that various modifications and variations can be made without departing from the spirit or scope of the present disclosure.

What is claimed is:

1. An optical film comprising:
a film layer comprising a transmissive material configured to transmit light, the film layer including an adhesion area in an edge region of an upper surface of the film layer and a receiving area that is on the upper surface of the film layer so as to be separate from the adhesion area;
an adhesive layer in the adhesion area;
a structure layer in the receiving area, the structure layer having optical properties; and
a protective layer comprising a transmissive material configured to transmit light, the protective layer on the structure layer and the adhesive layer, and attached to the film layer via the adhesive layer,
wherein the structure layer is separately provided from the film layer and attached to the receiving area of the film layer, and
wherein the film layer has an edge protruding structure such that the receiving area is a space recessed relative to the adhesion area.

2. The optical film according to claim 1, wherein the protective layer and the structure layer are disposed such that a lower surface of the protective layer and an upper surface of the structure layer are in contact with each other or are spaced apart from each other via the adhesive layer.

3. The optical film according to claim 1, wherein the adhesion area and the structure layer are stacked such that an upper surface of the adhesion area and an upper surface of the structure layer have a same height as each other.

4. The optical film according to claim 1, wherein the film layer and the protective layer have a same size and a same shape as each other.

5. The optical film according to claim 1, wherein the structure layer is in a shape of a lenticular lens comprising a plurality of lenses arranged in one direction.

6. The optical film according to claim 1, wherein the adhesive layer is a double-sided adhesive layer having adhesiveness on both sides thereof.

7. The optical film according to claim 6, wherein the adhesive layer comprises a first adhesive layer, a base layer and a second adhesive layer, and the first adhesive layer and the second adhesive layer comprise an acrylic-based or silicon-based material having adhesiveness.

8. A display device comprising:
a display panel configured to display images;

a light source configured to supply light to the display panel; and an optical film between the display panel and the light source, wherein the optical film comprises:

a film layer comprising a transmissive material configured to transmit light, the film layer including an adhesion area in an edge region of an upper surface of the film layer and a receiving area that is on the upper surface of the film layer so as to be separate from the adhesion area;

an adhesive layer in the adhesion area;

a structure layer in the receiving area, the structure layer having optical properties; and a protective layer comprising a transmissive material configured to transmit light, the protective layer on the structure layer and the adhesive layer, and attached to the film layer via the adhesive layer, wherein the structure layer is separately provided from the film layer and attached to the receiving area of the film layer, and wherein the film layer has an edge protruding structure such that the receiving area is a space recessed relative to the adhesion area.

9. A display device comprising:

a display panel configured to display images;

a light source configured to supply light to the display panel; and an optical film between the display panel and the light source, wherein the optical film comprises:

a film layer comprising a transmissive material configured to transmit light, the film layer including an adhesion area in an edge region of an upper surface of the film layer and a receiving area that is on the upper surface of the film layer so as to be separate from the adhesion area;

an adhesive layer in the adhesion area;

a structure layer in the receiving area, the structure layer having optical properties; and a protective layer comprising a transmissive material configured to transmit light, the protective layer on the structure layer and the adhesive layer, and attached to the film layer via the adhesive layer, wherein the structure layer is separately provided from the film layer and attached to the receiving area of the film layer, and wherein the film layer has an edge protruding structure such that the receiving area is a space recessed relative to the adhesion area.

10. The display device according to claim 9, wherein the protective layer and the structure layer are disposed such that a lower surface of the protective layer and an upper surface of the structure layer are in contact with each other or are spaced apart from each other via the adhesive layer.

11. An optical film comprising:

a film layer comprising a transmissive material configured to transmit light, the film layer including an adhesion area in an edge region of an upper surface of the film layer and a receiving area that is on the upper surface of the film layer so as to be separate from the adhesion area;

an adhesive layer in the adhesion area;

a structure layer in the receiving area, the structure layer having optical properties; and a protective layer comprising a transmissive material configured to light, the protective layer on the structure layer and the adhesive layer, and attached to the film layer via the adhesive layer, wherein an adhesion area the protective layer in which the adhesive layer is located is defined such that a width in a longitudinal direction and a width in a lateral direction are equal to each other, wherein the structure layer is separately provided from the film layer and attached to the receiving area of the film layer, and wherein the film layer has an edge protruding structure such that the receiving area is a space recessed relative to the adhesion area.

12. A display device comprising:

a display panel configured to display images;

a light source configured to supply light to the display panel; and the optical film according to claim 1 between the display panel and the light source.

\* \* \* \* \*